UNITED STATES PATENT OFFICE.

JOHN BELL IRVING, OF BALMACNEIL, BALLINLUIG, SCOTLAND.

COMPOSITION FOR MAKING AN INSECTICIDE.

934,533.   Specification of Letters Patent.   Patented Sept. 21, 1909.

No Drawing.   Application filed October 5, 1908.   Serial No. 456,262.

*To all whom it may concern:*

Be it known that I, JOHN BELL IRVING, a subject of the King of England, residing at Balmacneil, Ballinluig, Perthshire, Scotland, Great Britain, have invented new and useful Improvements in a Composition for Making an Insecticide, of which the following is a specification.

This invention has reference to the manufacture, application, and use of an insecticide or protective substance for washing hops and other plants, trees, and so forth; and the following is a description of the composition, and the method of its preparation and use, involving improvements hereunder.

As a base substance for the insecticide or protective substance, quassia-wood, or equivalent woods giving bitter extracts, is employed, and there is combined with it a fatty acid, which soaks into, or is absorbed by the wood. This compound when treated and used as hereafter described, is such that the bitter principle of the wood is extracted from it, and the extract serves as the insecticide or protective substance.

In some cases, prior to use—say at the place of use—the wood containing the fatty acid is mixed with an alkali in a dry state, and the extract of the bitter principle is produced, and the substance brought to the condition ready for use, by the admixture of the compound with heated water. In other cases, the wood containing the fatty acid is mixed and treated with a solution of an alkaline carbonate, and a soap solution is formed, and the bitter principle of the wood is extracted; and this solution thus produced, is then used upon the plants in any known or desired way.

When stearic acid is used, of course it must be heated to bring it into a liquid condition before mixing it with or applying it to the chips.

According to a modification, there is combined with the wood a suitable neutral fat, in which case, in the extraction of the bitter principle from it, caustic alkali must be used—*i. e.* at the time of preparation, before use of the solution—instead of the carbonate as above referred to.

This invention enables an insecticide or protective substance of the character referred to, to be produced at a relatively low cost, and in a very ready, simple, and convenient way; while at the same time providing an insecticide or protective medium against vegetable pests of a full effective character.

As examples of proportions of ingredients to be used in the preparation of the insecticide or protective solution, in the case of the fat ingredient being a neutral fat, the following may be advantageously employed:—

| | |
|---|---|
| Quassia chips | 13 parts by weight. |
| Olein | 5 " " " |
| Alkali (anhydrous carbonate of soda) | 2 " " " | or:—

| | |
|---|---|
| Quassia chips | 10 " " " |
| Olein | 5 " " " |
| Soda crystals | 5 " " " |

According to one manner of making up this compound, the olein is sprinkled or poured over the chips, and mixed with them, and then the alkali is sprinkled over the mixture, and the whole is then mixed thoroughly. It is then ready for market, and can be filled into bags or packages, and supplied in this form to the users.

It is to be noted that the proportion of chips, fatty acid (or neutral fat), and alkali, may be varied largely, to suit the users requirements, or to meet different or varying purposes to which it is to be applied, or to meet different hardnesses of water, and so on.

To prepare the solution, the ingredients are boiled in water for half-an-hour or more, and the solution so prepared—which may be treated as a stock solution—may be diluted to any extent desired.

What is claimed is:—

1. As a new composition, a base substance for use in making an insecticide, comprising quassia wood and a neutral fat.

2. As a new composition for use in making an insecticide, comminuted quassia chips containing a neutral fat.

3. As a composition for use in making an insecticide, quassia wood containing a neutral fat, and an alkali.

4. A composition for use in making an insecticide comprising 10 to 13 parts by weight of comminuted quassia chips, and 5 parts by weight of olein.

5. As a composition for use in making an insecticide, 13 parts by weight of comminuted quassia chips, 5 parts by weight of olein, and 2 parts by weight of anhydrous carbonate of soda.

In testimony whereof I have signed my name to this specification in the presence of two subscribing witnesses.

JOHN BELL IRVING.

Witnesses:
  JOHN PINKERTON,
  ROB SMITH.